June 26, 1923.
F. T. BENTLEY
1,460,308
STRAINER
Filed April 18, 1922
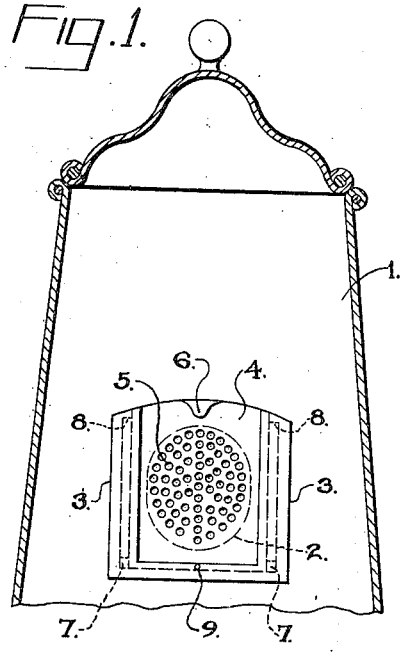
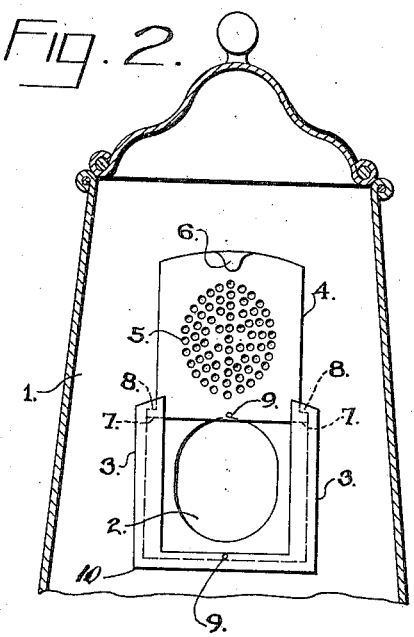
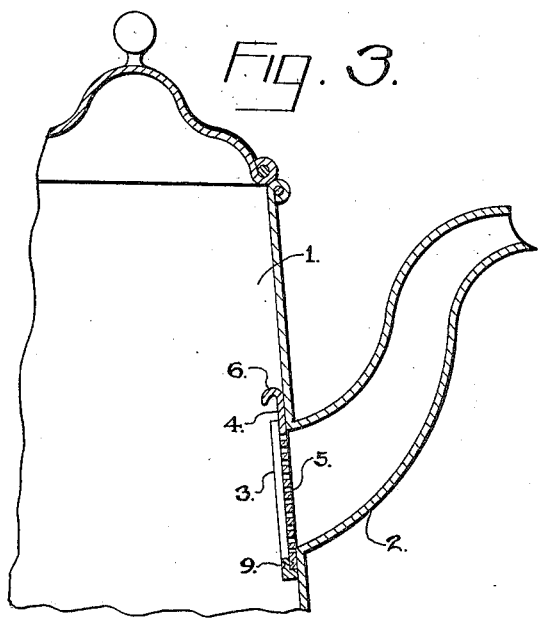
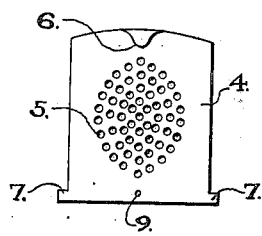
F. T. Bentley, INVENTOR
BY Victor J. Evans
ATTORNEY
WITNESS:

Patented June 26, 1923.

1,460,308

UNITED STATES PATENT OFFICE.

FRANK T. BENTLEY, OF PLATTEVILLE, WISCONSIN.

STRAINER.

Application filed April 18, 1922. Serial No. 554,374.

*To all whom it may concern:*

Be it known that I, FRANK T. BENTLEY, a citizen of the United States, residing at Platteville, in the county of Grant and State of Wisconsin, have invented new and useful Improvements in Strainers, of which the following is a specification.

The object of this invention is to provide a movable strainer for utensils which are provided with a pouring spout or opening so as to facilitate cleaning of the utensil.

Another object of the invention is to provide means for preventing the entire removal of the perforated part from the utensil so as to prevent such perforated part from being lost or misplaced.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of a tea-pot, with parts broken away, showing the invention in use.

Figure 2 is a similar view with the strainer in an open position; Fig. 3 is a side view thereof partly in section; Figure 4 is a detail view of the strainer per se.

In these views 1 indicates the pot and 2 the spout thereof. Guideways 3 are formed adjacent the opening which leads from the pot into the spout for receiving the plate 4 which is provided with perforations 5, this perforated plate acting to strain the fluid passing from the pot into the spout. The upper end of the plate is reduced and this reduced portion is bent toward the plate to provide a lip 6 which forms a finger engaging part and the lower end of the plate is provided with projections 7 at its sides which will engage shoulders 8 at the upper ends of the guideways and thus prevent the entire withdrawal of the plate from the guideways.

In order to prevent accidental movement of the plate in the guideways I provide a small projection on one member for engaging a small depression on the other member for frictionally holding the plate in the guideways. These holding means are shown generally at 9.

I prefer to form the guideways in a member 10 which may be soldered or otherwise attached to the interior of the coffee-pot.

It will thus be seen that when the pot is to be cleaned it is simply necessary to raise the perforated plate so that all grains or other solid material can be removed from the spout as well as from the interior of the pot.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A utensil having a spout, a vertically disposed guideway formed on each side of the opening leading from the utensil into the spout, a shoulder carried by the upper end of each guideway, a horizontally disposed guideway connecting the first mentioned guideways at their lower ends, a projection formed on the horizontally disposed guideway intermediate of its ends, a perforated plate adapted to slide in the vertically disposed guideways and being provided with a depression designed to receive the projection formed on the horizontally disposed guideway when the plate is normally seated, projections carried by the plate to prohibit its upward movement, and a lip integrally formed on said plate as and for the purpose specified.

In testimony whereof I affix my signature.

FRANK T. BENTLEY.